United States Patent
Gädt et al.

(10) Patent No.: US 8,993,701 B2
(45) Date of Patent: Mar. 31, 2015

(54) COPOLYMERS OF ISOPRENOL, MONOETHYLENICALLY UNSATURATED MONOCARBOXYLIC ACIDS AND SULFONIC ACIDS, METHODS FOR PRODUCTION THEREOF AND USE THEREOF AS DEPOSIT INHIBITORS IN WATER-BEARING SYSTEMS

(75) Inventors: Torben Gädt, Traunstein (DE); Jürgen Detering, Limburgerhof (DE); Stephan Nied, Neustadt (DE)

(73) Assignee: BASF SE, Ludwigshafen (DE)

( * ) Notice: Subject to any disclaimer, the term of this patent is extended or adjusted under 35 U.S.C. 154(b) by 441 days.

(21) Appl. No.: 13/545,455

(22) Filed: Jul. 10, 2012

(65) Prior Publication Data

US 2013/0178574 A1 Jul. 11, 2013

Related U.S. Application Data

(60) Provisional application No. 61/521,832, filed on Aug. 10, 2011.

(51) Int. Cl.
  *C08F 22/38* (2006.01)
  *C08F 220/06* (2006.01)
  *C08F 216/04* (2006.01)
  *C08F 220/58* (2006.01)

(52) U.S. Cl.
  CPC ............ *C08F 22/38* (2013.01); *C08F 220/06* (2013.01); *C08F 216/04* (2013.01); *C08F 220/58* (2013.01)
  USPC ............ 526/286; 524/547; 526/211; 526/288

(58) Field of Classification Search
  USPC .................. 526/286, 211, 288; 524/547
  See application file for complete search history.

(56) References Cited

U.S. PATENT DOCUMENTS

| | | | |
|---|---|---|---|
| 4,711,725 A | * | 12/1987 | Amick et al. ............. 210/701 |
| 4,952,327 A | | 8/1990 | Amjad et al. |
| 5,064,563 A | | 11/1991 | Yamaguchi et al. |
| 2012/0129749 A1 | | 5/2012 | Detering et al. |
| 2012/0129750 A1 | | 5/2012 | Detering et al. |

FOREIGN PATENT DOCUMENTS

| | | |
|---|---|---|
| EP | 0 337 694 A2 | 10/1989 |
| EP | 0 396 303 A2 | 11/1990 |
| JP | 59-102496 A | 6/1984 |
| JP | 59-108010 A | 6/1984 |

OTHER PUBLICATIONS

U.S. Appl. No. 13/545,534, filed Jul. 10, 2012, Detering, et al.
U.S. Appl. No. 13/569,538, filed Aug. 8, 2012, Detering, et al.
International Search Report issued Aug. 29, 2012 in PCT/EP2012/064406 (with English translation of Categories of Cited Documents).

* cited by examiner

*Primary Examiner* — Ling Choi
*Assistant Examiner* — Chun-Cheng Wang
(74) *Attorney, Agent, or Firm* — Oblon, McClelland, Maier & Neustadt, L.L.P.

(57) ABSTRACT

The invention relates to a copolymer of
(a) 5 to 40% by weight of isoprenol,
(b) 5 to 93% by weight of at least one monoethylenically unsaturated $C_3$ to $C_8$ monocarboxylic acid, an anhydride or salt of same,
(c) 2 to 90% by weight of one or more sulfonic acid group-comprising monomers.

17 Claims, No Drawings

COPOLYMERS OF ISOPRENOL, MONOETHYLENICALLY UNSATURATED MONOCARBOXYLIC ACIDS AND SULFONIC ACIDS, METHODS FOR PRODUCTION THEREOF AND USE THEREOF AS DEPOSIT INHIBITORS IN WATER-BEARING SYSTEMS

The invention relates to copolymers of isoprenol, monoethylenically unsaturated monocarboxylic acids and sulfonic acids, methods for production thereof and use thereof as deposit inhibitors in water-bearing systems.

The solubility of most substances in water is restricted. In particular, in industrial water treatment, the prevention of mineral sediments in water-bearing systems is an essential task. Inorganic salts such as calcium carbonate, magnesium hydroxide, calcium sulfate and barium sulfate, and calcium phosphate or calcium phosphonate have a low solubility in water. If these dissolved components are concentrated in aqueous systems (thickening), the solubility product is exceeded with the consequence that these substances precipitate out and cause sediments. The solubility of the substances is, in addition, dependent on temperature and the pH. In particular, many substances such as calcium carbonate, or calcium sulfate, exhibit an inverse solubility, i.e. their solubility decreases with increasing temperature. This leads to high process temperatures frequently being the cause of unwanted precipitates and formation of deposits in cooling and boiler feed water systems on heat-exchange surfaces or in pipelines.

Precipitates and sediments of inorganic substances and salts in water-bearing systems may only be removed again with great effort. Each mechanical and chemical cleaning is costly and time consuming and inescapably leads to production failures.

Not only in cooling and boiler feed water systems are attempts made to prevent the formation of calcium carbonate deposits, calcium sulfate deposits and other salt deposits. Also in seawater desalination by distillation and by membrane methods such as reverse osmosis or electrodialysis, efforts are made to prevent formation of these solid deposits.

There is particular interest in multifunctional deposit inhibitors which exhibit good inhibition properties for calcium carbonate, calcium sulfate, calcium phosphate and calcium phosphonate deposits. This is a problem for conventional deposit inhibitors such as, e.g., polyacrylic acids. Such homopolymers are frequently good deposit inhibitors for calcium carbonate or calcium sulfate, but have scarcely any inhibitory activity, in particular for calcium phosphate and calcium phosphonate deposits.

It is known to employ low-molecular-weight polyacrylic acids and salts thereof produced by means of free-radical polymerization as deposit inhibitors in industrial water treatment and in seawater desalination owing to the dispersant properties and properties inhibiting crystal growth thereof. For a good activity, the mean molecular weight ($M_w$) of these polymers should be <50 000 g/mol. Frequently, polyacrylic acids having $M_w$<10 000 g/mol are described as particularly effective. A disadvantage of these polymers is their sensitivity to hardness rising with increasing temperature, i.e. the risk that the polymers precipitate as Ca or Mg polyacrylates increases. In addition, the polyacrylic acids have only a very low inhibitory activity against sediments of calcium phosphate or calcium phosphonate.

Corrosion protection is indispensible in industrial aqueous processes. Among the customary corrosion inhibitors, phosphates and phosphonates are assuming an outstanding importance. However, with the use of phosphates or phosphonates as corrosion inhibitors, the risk of sediments from calcium phosphate or calcium phosphonate increases. These sediments are particularly problematic, since they can only be removed again with great effort.

In addition to pure polyacrylic acids, numerous copolymers, terpolymers and quater polymers have been described as deposit inhibitors. In this case, generally copolymers of unsaturated carboxylic acids such as acrylic acid, sulfonate-comprising monomers such as 2-acrylamido-2-methylpropanesulfonate, styrenesulfonate or sulfoethyl methacrylate, and optionally, nonionic monomers are described. The nonionic monomers are frequently acrylamide, acrylamide derivatives such as N-alkylacylamides, methacrylamide derivatives, alkyl acrylates, hydroxyalkyl acrylates, alkyl methacrylates or vinyl acetate.

U.S. Pat. No. 4,711,725 describes terpolymers of (1) (meth)acrylic acid, (2) acrylamidoalkyl- or -arylsulfonates, in particular 2-acrylamido-2-methylpropanesulfonate (AMPS), and (3) vinyl esters such as ethyl acrylate and hydroxyethyl methacrylate, or acrylamides such as tert-butylacrylamide as deposit inhibitors for aqueous systems.

U.S. Pat. No. 4,952,327 describes terpolymers of (1) (meth)acrylic acid or maleic acid, (2) acrylamidoalkanesulfonic acid, in particular AMPS, and (3) styrenesulfonic acid as deposit inhibitors for aqueous systems.

JP 59102496 describes the production of copolymers of 0.5 to 50% by weight of an unsaturated alcohol such as isoprenol with 50 to 99.5% by weight of an olefinic mono- or dicarboxylic acid, such as, e.g., acrylic acid or maleic acid, and optionally with 0 to 40% by weight of a third monomer which comprises, inter alia, styrenesulfonate, acrylonitrile or vinyl acetate. The resultant polymers are described as encrustation inhibitors in industrial water treatment. The monomers are used as initiator at 95° C. with a mixture of hydrogen peroxide and sodium persulfate. The molecular weight of the resultant polymers is between 3200 and 4000 g/mol.

EP-A 337 694 relates to the production of maleic acid copolymers having a number-average molecular weight $M_n$ from 300 to 5000 g/mol and a polydispersity of <2.5 of 50 to 99.9% by weight of maleic acid and 50 to 0.1% by weight of a water-soluble unsaturated comonomer, and also use thereof for the water treatment. The use as antiscalant and as builder in detergent formulations is explicitly mentioned. Comonomers described are, inter alia, monoethylenically unsaturated monocarboxylic acids such as acrylic acid and methacrylic acid, unsaturated dicarboxylic acids such as fumaric acid and itaconic acid, unsaturated alcohols such as isoprenol, (meth) allyl ether and monoethylenically unsaturated sulfonic acid group-comprising compounds such as vinylsulfonic acid and 2-acrylamido-2-methylpropanesulfonic acid. The copolymers are described by aqueous polymerization with $H_2O_2$ as initiator in the presence of 0.5 to 500 ppm of a metal catalyst comprising iron, copper or vanadium ions. A chain-transfer agent is not used. During the polymerization, carbon dioxide is released, wherein the amount of carbon dioxide is proportional to the amount of $H_2O_2$. In the examples, maleic acid-isoprenol copolymers having number-average molecular weights between 1090 and 4780 g/mol are produced, wherein the polymerization is carried out at the boiling point of the aqueous monomer solution.

EP-A 396 303 relates to producing maleic acid polymers of 75 to 100% by weight of maleic acid and 0 to 25% by weight of a further water-soluble monomer by aqueous polymerization with 12 to 150 g of $H_2O_2$ per mole of the monomer components, 0.3 to 500 ppm of a metal salt of iron, vanadium or copper and an alkaline substance such as alkali metal hydroxide or alkali metal carbonate in order to neutralize up to 45% by weight monomers having acid groups. Comonomers described are, inter alia, unsaturated monocarboxylic acids such as acrylic acid and methacrylic acid, unsaturated dicarboxylic acids such as fumaric acid and itaconic acid, unsaturated alcohols such as isoprenol, (meth)allyl ether and unsaturated sulfonic acid group-comprising compounds such as vinylsulfonic acid and 2-acrylamido-2-methylpropanesulfonic acid. A chain-transfer agent is not used. The polymerization temperature is said to be in the range from 85 to 160° C. In the examples, copolymers of 80% by weight of maleic acid and 20% by weight of isoprenol having number-average molecular weights between 2400 and 4100 g/mol are produced. The polymerization is carried out at the boiling point of the monomer mixture. The use of the copolymers as detergent builders and antiscalants is described.

A disadvantage of the methods of the prior art is the relatively narrow molecular weight range of the isoprenol-comprising copolymers thus obtainable, and also the high polymerization temperatures, at which olefinic alcohols such as isoprenol are subject to chemical degradation (see F. Lynen, Liebigs Ann. Chem. 1960, 360, 58 to 70). Associated therewith is a reduced activity of the isoprenol-comprising polymers corresponding to the prior art.

It is an object of the invention to provide multifunctional deposit-inhibiting polymers which have an activity as broad as possible against precipitates and sediments of calcium and magnesium salts and, in particular, effectively inhibit precipitates and deposits of calcium carbonate, calcium sulfate, calcium phosphate and calcium phosphonate in water-bearing systems. In addition, it is an object of the present invention to provide a suitable method for producing the copolymers.

The object is achieved by copolymers of
(a) 5 to 40% by weight of isoprenol,
(b) 5 to 93% by weight of at least one monoethylenically unsaturated $C_3$ to $C_8$ monocarboxylic acid, an anhydride or salt of same,
(c) 2 to 90% by weight of one or more sulfonic acid group-comprising monomers.

Suitable monoethylenically unsaturated $C_3$-$C_8$ monocarboxylic acids which can be used as monomers (b) are, for example, acrylic acid, methacrylic acid, ethacrylic acid, vinylacetic acid, allylacetic acid and crotonic acid and also the water-soluble salts thereof. If said unsaturated $C_3$-$C_8$ monocarboxylic acids can form anhydrides, these are also suitable as monomers (b), for example methacrylic anhydride.

Preferred monoethylenically unsaturated $C_3$-$C_8$ monocarboxylic acids (b) are acrylic acid, methacrylic acid, ethacrylic acid, vinylacetic acid, allylacetic acid and crotonic acid, particular preference is given to acrylic acid and methacrylic acid.

Sulfonic acid group-comprising monomers (c) are preferably those of the formulae (Ia) and (Ib)

$$H_2C=CH-X-SO_3H \quad (Ia),$$

$$H_2C=C(CH_3)-X-SO_3H \quad (Ib),$$

where X is an optionally present spacer group which can be selected from —$(CH_2)_n$— where n=0 to 4, —$C_6H_4$—, —$CH_2$—O—$C_6H_4$—, —C(O)—NH—$C(CH_3)_2$—, —C(O)—NH—$CH(CH_2CH_3)$—, —C(O)NH—$CH(CH_3)$$CH_2$—, —C(O)NH—$C(CH_3)_2CH_2$—, —C(O)NH—$CH_2CH(OH)CH_2$—, —C(O)NH—$CH_2$—, —C(O)NH—$CH_2CH_2$— and —C(O)NH—$CH_2CH_2CH_2$—.

Particularly preferred sulfonic acid group-comprising monomers are in this case 1-acrylamido-1-propanesulfonic acid (X=—C(O)NH—$CH(CH_2CH_3)$— in formula IIa), 2-acrylamido-2-propanesulfonic acid (X=—C(O)NH—CH$(CH_3)CH_2$— in formula IIa), 2-acrylamido-2-methylpropanesulfonic acid (AMPS, X=—C(O)NH—$C(CH_3)_2CH_2$— in formula IIa), 2-methacrylamido-2-methylpropanesulfonic acid (X=—C(O)NH—$C(CH_3)_2CH_2$— in formula IIb), 3-methacrylamido-2-hydroxypropanesulfonic acid (X=—C(O)NH—$CH_2CH(OH)CH_2$— in formula IIb), allylsulfonic acid (X=$CH_2$ in formula IIa), methallylsulfonic acid (X=$CH_2$ in formula IIb), allyloxybenzenesulfonic acid (X=—$CH_2$—O—$C_6H_4$— in formula IIa), methallyloxybenzenesulfonic acid (X=—$CH_2$—O—$C_6H_4$— in formula IIb), 2-hydroxy-3-(2-propenyloxy)propanesulfonic acid, 2-methyl-2-propene-1-sulfonic acid (X=$CH_2$ in formula IIb), vinylsulfonic acid (X not present in formula IIa), 3-sulfopropyl acrylate (X=—C(O)O—$CH_2CH_2CH_2$— in formula IIa), 2-sulfoethyl methacrylate (X=—C(O)O—$CH_2CH_2$— in formula IIb), 3-sulfopropyl methacrylate (X=—C(O)O—$CH_2CH_2CH_2$— in formula IIb), sulfomethacrylamide (X=—C(O)NH— in formula IIb), sulfomethylmethacrylamide (X=—C(O)NH—$CH_2$— in formula IIb), and also salts of said acids. Suitable salts are generally water-soluble salts, preferably the sodium, potassium and ammonium salts of said acids.

Particular preference is given to 1-acrylamidopropanesulfonic acid, 2-acrylamido-2-propanesulfonic acid, 2-acrylamido-2-methylpropanesulfonic acid (AMPS), 2-methacrylamido-2-methylpropanesulfonic acid, 3-methacrylamido-2-hydroxypropanesulfonic acid, 2-sulfoethyl methacrylate, sulfonic acid, vinylsulfonic acid, allylsulfonic acid (ALS) and methallylsulfonic acid, and also salts of said acids.

Very particularly preferred sulfonic acid group-comprising monomers are 2-acrylamido-2-methylpropanesulfonic acid (AMPS) and allylsulfonic acid, and also water-soluble salts thereof, in particular sodium, potassium and ammonium salts thereof. Particular preference is given to AMPS.

Generally, the weight-average molecular weight of the copolymers is 2000 to 20 000 g/mol, preferably 2500 to 15 000 g/mol, and particularly preferably 3000 to 13 000 g/mol.

The molecular weight is determined by means of gel permeation chromatography compared with polyacrylic acid standards.

Generally, the polydispersity index of the copolymers is $M_w/M_n \leq 2.5$, preferably $\leq 2.0$.

Generally, the copolymers according to the invention comprise 5 to 35% by weight of isoprenol (a), 30 to 80% by weight of the monoethylenically unsaturated $C_3$ to $C_8$ carboxylic acid (b) and 5 to 50% by weight of the sulfonic acid group-comprising monomer (c). Particularly preferably, they comprise 5 to 30% by weight of isoprenol (a), 50 to 80% by weight of the monoethylenically unsaturated $C_3$ to $C_8$ carboxylic acid (b) and 10 to 30% by weight of the sulfonic acid group-comprising monomer (c).

The copolymers according to the invention are distinguished, in particular, in that they are obtained by a particularly mild polymerization method in which side reactions such as the isomerization from isoprenol to prenol or dimethylvinyl carbinol, the formation of 3-methyl-1,3-butanediol or isoprene or decarboxylation of maleic acid do not occur.

Known methods for producing isoprenol-comprising copolymers are based on free-radical polymerization at elevated temperatures around 100° C. It is known that, in particular, isoprenol under acidic conditions and high temperatures is rapidly subject to chemical degradation (F. Lynen, Liebigs Ann. Chem. 1960, 360, 58 to 70). In contrast, the method according to the invention makes possible a substantially milder polymerization reaction at temperatures between 10 to 80° C. Thus degradation of the isoprenol is effectively prevented. Preferably, the polymerization is carried out at 10 to 70° C., particularly preferably at 10 to 60° C.

The method according to the invention is generally carried out semi-continuously in the feed-stream procedure. The solvent used is generally water.

According to a preferred embodiment, the polymerization is carried out in aqueous solution with a monomer content of 25 to 50% by weight. In this case the free-radical polymerization is carried out under acidic conditions, generally at pH 0.5 to 6.5. It is preferably performed in such a manner that all monomers (a), (b) and (c) are added as feed, wherein the monoethylenically unsaturated $C_3$-$C_8$ monocarboxylic acids (b), e.g. acrylic acid can also be partially neutralized. Isoprenol (a), monoethylenically unsaturated $C_3$-$C_8$ monocarboxylic acid (b), e.g. acrylic acid, and sulfonic acid group-comprising monomer (c), for example 2-acrylamido-2-methylpropanesulfonic acid, can also be charged initially in full or in part. For example, the monomer (c) can be situated in the receiver and the monomers (a) and (b) can be added as feed. (Meth)allyl sulfonate as monomer (c) is preferably charged initially.

In a further embodiment, the polymerization is carried out in a water/methanol mixture having a monomer content of 25 to 50% by weight. In a special embodiment, isoprenol in methanol is added as feed. After the end of the polymerization, methanol can be removed under reduced pressure, wherein an aqueous polymer solution is obtained having a solids content of preferably 30 to 60% by weight.

The reducing agent is generally added separately as feed. This lowers the activation threshold of the peroxidic initiator, such that the copolymerization can be carried out at low temperatures.

Generally, the redox chemical initiator comprises a peroxide and a reducing agent.

Suitable peroxides are, for example, hydrogen peroxide, sodium, potassium or ammonium peroxodisulfate, tert-butyl hydroperoxide, dibenzoyl peroxide or cumyl hydroperoxide. In a preferred embodiment, the initiator comprises hydrogen peroxide. Hydrogen peroxide is generally used as aqueous solution, for example having a hydrogen peroxide content of 30% by weight.

Hydrogen peroxide is preferably situated in the receiver, but can be also added as feed.

Suitable reducing agents are, for example, iron(II) salts, sodium hydroxymethanesulfinate (for example available as Rongalit or Brüggolit SFS), sodium-2-hydroxy-2-sulfinatoacetic acid (for example available as Brüggolit FF06), ascorbic acid, alkali metal sulfites and alkali metal metabisulfites, sodium hypophosphite and thiourea. In a preferred embodiment, the initiator, as reducing agent, comprises sodium hydroxymethanesulfinate or sodium 2-hydroxy-2-sulfinatoacetic acid.

In a further embodiment, the initiator, in addition to the peroxide and the reducing agent, comprises an iron salt.

In a particularly preferred embodiment, the redox chemical initiator comprises hydrogen peroxide, an iron salt and also a reducing agent.

Suitable chain-transfer agents are inorganic sulfur compounds such as hydrogen sulfites, disulfites and dithionites, organic sulfides, sulfoxides, sulfones and mercapto compounds such as mercaptoethanol, mercaptoacetic acid and also inorganic phosphorus compounds such as hypophosphorous acid (phosphinic acid) and salts thereof, e.g. sodium hypophosphite.

In a preferred embodiment, the chain-transfer agent comprises a mercapto compound, in particular mercaptoethanol.

The chain-transfer agent is generally added at least in part as feed. A subquantity of the chain-transfer agent can also be situated in the receiver.

The present invention also relates to the use of the copolymers for inhibiting the precipitation and sedimentation of calcium salts in water-bearing systems, in particular for inhibiting the precipitation and sedimentation of calcium carbonate, calcium sulfate, calcium phosphate or calcium phosphonate. The copolymers according to the invention are distinguished in that they inhibit the precipitation of two or more of said calcium salts.

Water-bearing systems in which the isoprenol-comprising copolymers can be used are, in particular, cooling water systems and boiler feed water systems, and also seawater desalination plants.

Generally, the polymers according to the invention are added to the water-bearing systems in amounts of 0.1 mg/l to 100 mg/l. The optimum dosage depends on the requirements of the respective application and the operating conditions of the respective method. For instance, in the thermal desalination of seawater the polymers are preferably used in concentrations from 0.5 mg/l to 10 mg/l. In industrial cooling circuits or boiler feed water systems, polymer concentrations up to 100 mg/l are employed. Frequently, water analyses are carried out in order to determine the proportion of deposit-forming salts and therefore the optimum dosage.

Formulations can also be added to the water-bearing systems, which formulations, in addition to the copolymers according to the invention, according to requirements, can comprise, inter alia, phosphonates, polyphosphates, zinc salts, molybdate salts, organic corrosion inhibitors such as benzotriazole, tolyltriazole, benzimidazole or ethynyl carbinol alkoxylates, biocides, complexing agents and/or surfactants. Examples of phosphonates are 1-hydroxyethane-1,1-diphosphonic acid (HEDP), 2-phosphonobutane-1,2,4-tricarboxylic acid (PBTC), aminotrimethylenephosphonic acid (ATMP), diethylenetriaminepenta(methylenephosphonic acid) (DTPMP) and ethylenediaminetetra(methylenephosphonic acid) (EDTMP), which are used in the acid form or in the form of sodium salts thereof.

The invention is described in more detail by the examples hereinafter.

EXAMPLES

The medium molecular weights were determined by means of GPC.

Instrument: Waters Alliance 2690 with UV-detector (Waters 2487) and RI detector (Waters 2410)

Columns: Shodex OHpak SB 804HQ and 802.5HQ (PHM gel, 8×300 mm, pH 4.0 to 7.5)

Eluent: 0.05 M aqueous ammonium formate/methanol mixture=80:20 (parts by volume)

Flow rate: 0.5 ml/min

Temperature: 50° C.

Injection: 50 to 100 µl

Detection: RI and UV

Molecular weights of the polymers were determined relative to polyacrylic acid standards from Varian Inc. The molecular weight distribution curves of the polyacrylic acid standards were determined by light scattering. The masses of the polyacrylic acid standards were 115 000, 47 500, 28 000, 16 000, 7500, 4500, 4100, 2925 and 1250 g/mol.

Synthesis Examples

Example 1

IP/AS/AMPS (10/70/20)—Terpolymer

In a glass reactor equipped with stirrer, thermometer, pH electrode and a plurality of feed appliances, 125 g of deionized water, 0.5 g of 2-mercaptoethanol and 0.02 g of iron(II) sulfate heptahydrate were charged and brought to and maintained at a polymerization start temperature of 20° C. (receiver). In a separate feed vessel, 81 g of 90% strength by weight acrylic acid were provided (solution A). 10 g of isoprenol were charged (solution B) into a further separate feed vessel. In a further separate feed vessel, 45 g of a 50% strength by weight aqueous AMPS solution were mixed with 4 g of 2-mercaptoethanol (solution C). In parallel thereto, a third solution of 5 g of sodium hydroxymethanesulfinate (Brüggolit SFS from Brüggemann GmbH) in 45 g of water was produced (solution D). Then, 14 g of hydrogen peroxide (30% by weight in water) were added to the receiver mixture. The addition of solution A, solution B, solution C and solution D to the stirred receiver was started simultaneously.

Solution A was added over 60 minutes at a metering rate of 80 g/h.

Solution B was added over a period of 60 minutes in parallel at a metering rate of 10 g/h.

Solution C was added over a period of 60 minutes in parallel at a metering rate of 49 g/h.

Solution D was added over a period of 70 minutes in parallel at a metering rate of 20 g/h.

Then, the polymer solution obtained was adjusted to a pH of 2.6 using a 50% strength by weight sodium hydroxide solution.

The copolymer obtained was produced in a colorless solution which had a solids content of 37%. The medium molecular weight of the copolymer was Mw 4900 g/mol.

Example 2

IP/AS/AMPS (10/70/20)—Terpolymer

In a glass reactor equipped with stirrer, thermometer, pH electrode and a plurality of feed appliances, 125 g of deionized water, 0.5 g of 2-mercaptoethanol and 0.02 g of iron(II) sulfate heptahydrate were charged and brought to and maintained at a polymerization start temperature of 20° C. (receiver). In a separate feed vessel, 81 g of 90% by weight acrylic acid were provided (solution A). 10 g of isoprenol were charged (solution B) into a further separate feed vessel. In a further separate feed vessel, 45 g of a 50% by weight aqueous AMPS solution were mixed with 2 g of 2-mercaptoethanol (solution C). In parallel thereto, a third solution of 5 g of sodium hydroxymethanesulfinate (Brüggolit SFS from Brüggemann GmbH) in 45 g of water was produced (solution D). Then, 14 g of hydrogen peroxide (30% by weight in water) were added to the receiver mixture. The addition of solution A, solution B, solution C and solution D to the stirred receiver was started simultaneously.

Solution A in this case was added over 60 minutes at a metering rate of 80 g/h.

Solution B was added over said period of 60 minutes in parallel at a metering rate of 10 g/h.

Solution C was added over said period of 60 minutes in parallel at a metering rate of 47 g/h.

Solution D was added over said period of 70 minutes in parallel at a metering rate of 20 g/h.

Then, the polymer solution obtained was adjusted to a pH of 2.6 using a 50% strength by weight sodium hydroxide solution.

The copolymer obtained was produced as a colorless solution which had a solids content of 36% by weight. The medium molecular weight of the copolymer was Mw 10 000 g/mol.

Example 3

IP/AS/AMPS (15/60/25)—Terpolymer

In a glass reactor equipped with stirrer, thermometer, pH electrode and a plurality of feed appliances, 125 g of deionized water, 0.5 g of 2-mercaptoethanol and 0.02 g of iron(II) sulfate heptahydrate were charged and brought to and maintained at a polymerization start temperature of 20° C. In a separate feed vessel, 81 g of 90% strength by weight acrylic acid were provided (solution A). 18 g of isoprenol were charged (solution B) into a further separate feed vessel. In a further separate feed vessel, 66 g of a 50% strength by weight aqueous AMPS solution were mixed with 4 g of 2-mercaptoethanol (solution C). In parallel thereto, a third solution of 5 g of sodium hydroxymethanesulfinate (Brüggolit SFS from Brüggemann GmbH) in 45 g of water was produced (solution D). Then, 14 g of hydrogen peroxide (30% by weight in water) were added to the receiver mixture. The addition of solution A, solution B, solution C and solution D to the stirred receiver was started simultaneously.

Solution A was added over a period of 60 minutes at a metering rate of 80 g/h.

Solution B was added over a period of 60 minutes in parallel at a metering rate of 18 g/h.

Solution C was added over a period of 60 minutes in parallel at a metering rate of 70 g/h.

Solution D was added over a period of 70 minutes in parallel at a metering rate of 20 g/h.

Then, the polymer solution obtained was adjusted to a pH of 2.6 using a 50% strength by weight sodium hydroxide solution.

The copolymer obtained was produced as a colorless solution which had a solids content of 39% by weight. The medium molecular weight of the copolymer was Mw 6500 g/mol.

Example 4

IP/AS/AMPS (20/60/20)—Terpolymer

In a glass reactor equipped with stirrer, thermometer, pH electrode and a plurality of feed appliances, 125 g of deionized water, 0.5 g of 2-mercaptoethanol and 0.02 g of iron(II) sulfate heptahydrate were charged and brought to and maintained at a polymerization start temperature of 20° C. In a separate feed vessel, 81 g of 90% strength by weight acrylic acid were provided (solution A). 24 g of isoprenol were charged (solution B) into a further separate feed vessel. In a further separate feed vessel, 53 g of a 50% strength by weight aqueous AMPS solution were mixed with 2 g of 2-mercaptoethanol (solution C). In parallel thereto, a third solution of 5 g of sodium hydroxymethanesulfinate (Brüggolit SFS from Brüggemann GmbH) in 45 g of water was produced (solution D). Then, 14 g of hydrogen peroxide (30% by weight in water) were added to the receiver mixture. The addition of solution A, solution B, solution C and solution D to the stirred receiver was started simultaneously.

Solution A in this case was added over a period of 60 minutes at a metering rate of 80 g/h.

Solution B was added over said period of 60 minutes in parallel at a metering rate of 24 g/h.
Solution C was added over said period of 60 minutes in parallel at a metering rate of 55 g/h.
Solution D was added over said period of 70 minutes in parallel at a metering rate of 20 g/h.

Then, the polymer solution obtained was adjusted to a pH of 2.6 using a 50% strength by weight sodium hydroxide solution.

The copolymer obtained was produced in a colorless solution which had a solids content of 39%. The medium molecular weight of the copolymer was Mw 11 000 g/mol.

Example 5

IP/AS/ALS (10/70/20)—Terpolymer
In a glass reactor equipped with stirrer, thermometer, pH electrode and a plurality of feed appliances, 140 g of deionized water, 20 g of sodium allylsulfonate, 0.5 g of 2-mercaptoethanol and 0.02 g of iron(II) sulfate heptahydrate were charged and brought to and maintained at a polymerization start temperature of 20° C. In a separate feed vessel, 81 g of 90% strength by weight acrylic acid were provided (solution A). 10 g of isoprenol were charged (solution B) into a further separate feed vessel. In a further separate feed vessel, 15 g of water were mixed with 4 g of 2-mercaptoethanol (solution C). In parallel thereto, a third solution of 5 g of sodium hydroxymethanesulfinate (Brüggolit SFS from Brüggemann GmbH) in 45 g of water was produced (solution D). Then, 14 g of hydrogen peroxide (30% by weight in water) were added to the receiver mixture. The addition of solution A, solution B, solution C and solution D to the stirred receiver was started simultaneously.
Solution A was added over a period of 60 minutes at a metering rate of 80 g/h.
Solution B was added over a period of 60 minutes in parallel at a metering rate of 10 g/h.
Solution C was added over a period of 60 minutes in parallel at a metering rate of 19 g/h.
Solution D was added over a period of 60 minutes in parallel at a metering rate of 20 g/h.

Then, the polymer solution obtained was adjusted to a pH of 2.6 using a 50% strength by weight sodium hydroxide solution.

The copolymer obtained was produced in a colorless solution which had a solids content of 38% by weight. The medium molecular weight of the copolymer was Mw 5400 g/mol.

Example 6

IP/AS/ALS (10/75/15)—Terpolymer
In a glass reactor equipped with stirrer, thermometer, pH electrode and a plurality of feed appliances, 27 g of deionized water, 14 g of sodium allylsulfonate, 40 g of methanol, 0.5 g of 2-mercaptoethanol and 0.01 g of iron(II) sulfate heptahydrate were charged and brought to and maintained at a polymerization start temperature of 20° C. In a separate feed vessel, 81 g of 90% strength by weight acrylic acid were provided (solution A). In a further separate feed vessel, 9 g of isoprenol were mixed with 32 g of methanol (solution B). In a further separate feed vessel, 10 g of water were mixed with 3.5 g of 2-mercaptoethanol (solution C). In parallel thereto, a third solution of 5 g of sodium hydroxymethanesulfinate (Brüggolit SFS from Brüggemann GmbH) in 45 g of water was produced (solution D). Then, 6 g of hydrogen peroxide (30% by weight in water) were added to the receiver mixture. The addition of solution A, solution B, solution C and solution D to the stirred receiver was started simultaneously.
Solution A in this case was added over 40 minutes at a metering rate of 120 g/h.
Solution B was added over said period of 40 minutes in parallel at a metering rate of 61 g/h.
Solution C was added over said period of 40 minutes in parallel at a metering rate of 21 g/h.
Solution D was added over said period of 60 minutes in parallel at a metering rate of 10 g/h.

Then, the methanol was removed at reduced pressure. The remaining aqueous polymer solution was adjusted to a pH of 2.6 using a 50% strength by weight sodium hydroxide solution.

The resultant copolymer was produced in a colorless solution which had a solids content of 49%. The medium molecular weight of the copolymer was Mw 4000 g/mol.

Example 7

IP/AS/ALS (15/65/20)—Terpolymer
In a glass reactor equipped with stirrer, thermometer, pH electrode and a plurality of feed appliances, 115 g of deionized water, 21 g of sodium allylsulfonate, 0.5 g of 2-mercaptoethanol and 0.01 g of iron(II) sulfate heptahydrate were charged and brought to and maintained at a polymerization start temperature of 20° C. In a separate feed vessel, 81 g of 90% strength by weight acrylic acid were mixed with 64 g of water (solution A). 16.5 g of isoprenol were charged (solution B) into a further separate feed vessel. In a further separate feed vessel, 10 g of water were mixed with 3.5 g of 2-mercaptoethanol (solution C). In parallel thereto, a third solution of 5 g of sodium hydroxymethanesulfinate (Brüggolit SFS from Brüggemann GmbH) in 45 g of water was produced (solution D). Then, 6 g of hydrogen peroxide (30% by weight in water) were added to the receiver mixture. The addition of solution A, solution B, solution C and solution D to the stirred receiver was started simultaneously.
Solution A was added in this case over 60 minutes at a metering rate of 145 g/h.
Solution B was added over said period of 60 minutes in parallel at a metering rate of 16.5 g/h.
Solution C was added over said period of 60 minutes in parallel at a metering rate of 13.5 g/h.
Solution D was added over said period of 60 minutes in parallel at a metering rate of 12 g/h.

Then, methanol was removed under reduced pressure. The remaining aqueous polymer solution was adjusted to a pH of 2.6 using a roughly 50% strength by weight sodium hydroxide solution.

The copolymer obtained was produced in a colorless solution which had a solids content of 38% by weight. The medium molecular weight of the copolymer was Mw 6200 g/mol.

Example 8

IP/AS/ALS (20/60/20)—Terpolymer
In a glass reactor equipped with stirrer, thermometer, pH electrode and a plurality of feed appliances, 140 g of deionized water, 31 g of sodium allylsulfonate, 0.5 g of 2-mercaptoethanol and 0.02 g of iron(II) sulfate heptahydrate were charged and brought to and maintained at a polymerization start temperature of 20° C. In a separate feed vessel, 81 g of 90% strength by weight acrylic acid were provided (solution A). 24 g of isoprenol were charged (solution B) into a further separate feed vessel. In a further separate feed vessel, 15 g of water were mixed with 3 g of 2-mercaptoethanol (solution C). In parallel thereto, a third solution of 5 g of sodium hydroxymethanesulfinate (Brüggolit SFS from Brüggemann GmbH) in 45 g of water was produced (solution D). Then, 14 g of hydrogen peroxide (30% by weight in water) were added to the receiver mixture. The addition of solution A, solution B, solution C and solution D to the stirred receiver was started simultaneously.

Solution A was added over a period of 60 minutes at a metering rate of 80 g/h.
Solution B was added over said period of 60 minutes in parallel at a metering rate of 24 g/h.
Solution C was added over said period of 60 minutes in parallel at a metering rate of 18 g/h.
Solution D was added over said period of 70 minutes in parallel at a metering rate of 20 g/h.

Then, the polymer solution obtained was adjusted to a pH of 2.6 using a roughly 50% strength by weight sodium hydroxide solution.

The copolymer obtained was produced in a colorless solution which had a solids content of 41%. The medium molecular weight of the copolymer was Mw 8100 g/mol.

Comparative Example A

Polyacrylic Acid A

In a reactor, 304.0 g of deionized water were charged together with 1.84 g of a 50% strength by weight aqueous solution of phosphorous acid and heated under a nitrogen atmosphere to 98° C. internal temperature. At this temperature, simultaneously, 461.0 g of a distilled acrylic acid, 132.0 g of a 7% strength by weight sodium peroxodisulfate solution and 196.0 g of a 40% strength by weight aqueous sodium bisulfite solution were added separately and in parallel with stirring. Acrylic acid was added in the course of 4 hours, sodium peroxodisulfate in the course of 4.25 hours and sodium bisulfite in the course of 3.75 hours. After completion of the acrylic acid feed, 496.0 g of a 50% strength by weight aqueous sodium hydroxide solution were added in the course of 1 hour at 98° C. internal temperature, and polymerization was continued for a further 1 hour at 98° C. Thereafter, the polymer solution was cooled to room temperature. A slightly viscose clear polymer solution was obtained having a pH of 6.9 and a solids content of 43.5%. The weight average molecular weight (Mw) is 4450 g/mol Comparative Example B AS/AMPS (80/20)—Copolymer In a glass reactor equipped with stirrer, thermometer, pH electrode and a plurality of feed appliances, 100 g of deionized water, 0.5 g of 2-mercaptoethanol and 0.01 g of iron(II) sulfate heptahydrate were charged and brought to and maintained at a polymerization start temperature of 20° C. In a separate feed vessel, 88 g of 90% strength by weight acrylic acid (solution A) were provided. In a further separate feed vessel, 40 g of a 50% strength by weight aqueous AMPS solution were mixed with 3.5 g of 2-mercaptoethanol (solution B). In parallel thereto, a third solution of 5 g of sodium hydroxymethanesulfinate (Brüggolit SFS from Brüggemann GmbH) in 45 g of water was produced (solution C). Then, 6 g of hydrogen peroxide (30% by weight in water) were added to the receiver mixture. The addition of solution A, solution B and solution C to the stirred receiver was started simultaneously.

Solution A was added over a period of 60 minutes at a metering rate of 88 g/h.
Solution B was added over a period of 60 minutes in parallel at a metering rate of 44 g/h.
Solution C was added over said period of 60 minutes in parallel at a metering rate of 10 g/h.

Then, the polymer solution obtained was adjusted to a pH of 2.6 using an about 50% strength by weight sodium hydroxide solution.

The copolymer obtained was produced in a colorless solution which had a solids content of 39% by weight. The medium molecular weight of the copolymer was Mw 6500 g/mol.

Comparative Example C

AS/AMPS/tBAM (70:20:10)—Terpolymer

In a glass reactor equipped with stirrer, thermometer, pH electrode and a plurality of feed appliances, 70 g of deionized water, 0.25 g of 2-mercaptoethanol and 0.02 g of iron(II) sulfate heptahydrate were charged and brought to and maintained at a polymerization start temperature of 20° C. (receiver). In a separate feed vessel, 80 g of 90% strength by weight acrylic acid were neutralized with 62 g of 50% sodium hydroxide solution (solution A). In a further separate feed vessel, 41 g of a 50% strength by weight aqueous AMPS solution were mixed with 4 g of 2-mercaptoethanol (solution B). In a further feed solution, 12 g of tert-butylacrylamide were mixed with 45 g of methanol (solution C).

In parallel thereto, a solution of 5 g of sodium hydroxymethanesulfinate (Brüggolit SFS from Brüggemann GmbH) in 45 g of water was produced (solution D). Then, 6 g of hydrogen peroxide (30% by weight in water) were added to the receiver mixture. The addition of solution A, solution B, solution C and solution D to the stirred receiver was started simultaneously.

Solution A was added in this case over 60 minutes at a metering rate of 80 g/h.
Solution B was added over said period of 60 minutes in parallel at a metering rate of 45 g/h.
Solution C was added over said period of 60 minutes in parallel at a metering rate of 47 g/h.
Solution D was added over said period of 70 minutes in parallel at a metering rate of 15 g/h.

Then, the methanol was removed under reduced pressure. The remaining aqueous polymer solution was adjusted to a pH of 2.6 using a 50% strength by weight sodium hydroxide solution.

The copolymer obtained was produced in a colorless solution which had a solids content of 40% by weight. The medium molecular weight of the copolymer was Mw 5800 g/mol.

Calcium Carbonate Inhibition Test

A solution of $NaHCO_3$, $Mg_2SO_4$, $CaCl_2$ and polymer is shaken for 2 h at 70° C. in waterbath. After filtration of the still warm solution through a 0.45 μm Milex filter, the Ca content of the filtrate is determined by optical emission spectrometry using inductively coupled plasma (ICP-OES) and determined in accordance with the formula I hereinafter by comparing before/after the $CaCO_3$ inhibition in %.

Conditions:

| | |
|---|---|
| $Ca^{2+}$ | 215 mg/l |
| $mg^{2+}$ | 43 mg/l |
| $HCO_3^-$ | 1220 mg/l |
| $Na^+$ | 460 mg/l |
| $Cl^-$ | 380 mg/l |
| $SO_4^{2-}$ | 170 mg/l |

-continued

| | |
|---|---|
| Polymer 100% pure | 3 mg/l |
| Temperature | 70° C. |
| Time | 2 hours |
| pH | 8.0-8.5 |

$CaCO_3$—inhibition (%)=mg ($Ca^{2+}$) after 24 h–mg ($Ca^{2+}$) blank value after 24 h/mg ($Ca^{2+}$) zero value–mg ($Ca^{2+}$) blank value after 24 h×100  Formula I Calcium Sulfate Inhibition Test A solution of NaCl, $Na_2SO_4$, $CaCl_2$ and polymer was shaken for 24 h at 70° C. in a waterbath. After filtration of the still warm solution through a 0.45 μm Milex filter, the Ca content of the filtrate is determined by optical emission spectrometry using inductively coupled plasma (ICP-OES) and determined by comparison of before/after the $CaSO_4$ inhibition in % according to the formula II hereinafter.

Conditions:

| | |
|---|---|
| $Ca^{2+}$ | 2940 mg/l |
| $SO_4^{2-}$ | 7200 mg/l |
| $Na^+$ | 6400 mg/l |
| $Cl^-$ | 9700 mg/l |
| Polymer 100% pure | 5 mg/l (100% pure) |
| Temperature | 90° C. |
| Time | 24 hours |
| pH | 8.0-8.5 |

$CaSO_4$—inhibition (%)=mg ($Ca^{2+}$) after 24 h–mg ($Ca^{2+}$) blank value after 24 h/mg ($Ca^{2+}$) zero value–mg ($Ca^{2+}$) blank value after 24 h×100  Formula II Calcium Phosphate Inhibition Test A solution of $H_3PO_4$, $CaCl_2$, $NaHCO_3$, $MgSO_4$ and polymer was shaken for 24 h at 70° C. in a waterbath. After filtration of the still warm solution through a 0.45 μm Milex filter, the phosphate content of the filtrate is determined by optical emission spectrometry using inductively coupled plasma (ICP-OES) and by comparison of before/after the $Ca_3(PO_4)_2$ inhibition in % according to formula III hereinafter:

Conditions:

| | |
|---|---|
| $Ca^{2+}$ | 148 mg/l |
| $mg^{2+}$ | 38 mg/l |
| $PO_4^{3-}$ | 10 mg/l |
| $SO_4^{2-}$ | 157 mg/l |
| $Cl^-$ | 263 mg/l |
| $Na^+$ | 146 mg/l |
| $HCO_3^-$ | 388 mg/l |
| Polymer 100% pure | 15 mg/l |
| Temperature | 70° C. |
| Time | 24 hours |
| pH | 8.0 to 8.5 |

$Ca_3(PO_4)_2$—inhibition (%)=mg ($PO_4^{3-}$) after 24 h–mg ($PO_4^{3-}$) blank value after 24 h/mg ($PO_4^{3-}$) zero value–mg ($PO_4^{3-}$) blank value after 24 h×100  Formula III The results of the tests are summarized in the table hereinafter.

TABLE

| No. | Monomer | Weight % | $M_w$ g/mol | Inhibition $CaCO_3$ in % | Inhibition $CaSO_4$ in % | Inhibition $Ca_3(PO_4)_2$ in % |
|---|---|---|---|---|---|---|
| 1 | IP/AS/AMPS | 10/70/20 | 4900 | 69 | 35 | 87 |
| 2 | IP/AS/AMPS | 10/70/20 | 10 000 | 74 | 34 | 90 |
| 3 | IP/AS/AMPS | 15/60/25 | 6500 | 72 | 41 | 88 |
| 4 | IP/AS/AMPS | 20/60/20 | 11 000 | 75 | 35 | 86 |
| 5 | IP/AS/ALS | 10/70/20 | 5400 | 66 | 36 | 79 |
| 6 | IP/AS/ALS | 10/75/15 | 4000 | 63 | 38 | 80 |
| 7 | IP/AS/ALS | 15/65/25 | 6200 | 60 | 25 | 83 |
| 8 | IP/AS/ALS | 20/60/20 | 8100 | 70 | 32 | 82 |
| A | Polyacrylic acid A | | 4500 | 60 | 15 | 3 |
| B | AS/AMPS | 80/20 | 6500 | 66 | 28 | 70 |
| C | AS/AMPS/tBAM | 70/20/10 | 5800 | 45 | 29 | 72 |

Abbreviations:
IP = Isoprenol
AS = Acrylic acid
ALS = Allylsulfonic acid sodium salt
AMPS = 2-Acrylamido-2-methylpropanesulfonic acid
tBAM = tert-Butylacrylamide

The invention claimed is:

1. A copolymer comprising:
   (a) 5 to 40% by weight of isoprenol,
   (b) 5 to 93% by weight of at least one monoethylenically unsaturated $C_3$ to $C_8$ monocarboxylic acid, or an anhydride or salt thereof, and
   (c) 2 to 90% by weight of one or more sulfonic acid group-comprising monomers.

2. The copolymer according to claim 1, wherein the monoethylenically unsaturated $C_3$-$C_8$ monocarboxylic acid (b) is selected from the group consisting of acrylic acid, methacrylic acid, ethacrylic acid, vinylacetic acid, allylacetic acid and crotonic acid.

3. The copolymer according to claim 2, wherein the monoethylenically unsaturated $C_3$-$C_8$ monocarboxylic acid (b) is acrylic acid or methacrylic acid.

4. The copolymer according to claim 1, wherein the sulfonic acid group-comprising monomer (c) is selected from the group consisting of 1-acrylamidopropanesulfonic acid, 2-acrylamido-2-propanesulfonic acid, 2-acrylamido-2-methylpropanesulfonic acid (AMPS), 2-methacrylamido-2-methylpropanesulfonic acid, 3-methacrylamido-2- hydroxypropanesulfonic acid, 2-sulfoethyl methacrylate, styrenesulfonic acid, vinylsulfonic acid, allylsulfonic acid (ALS) and methallylsulfonic acid.

5. The copolymer according to claim 4, wherein the sulfonic acid group-comprising monomer (c) is 2-acrylamido-2-methylpropanesulfonic acid (AMPS) or allylsulfonic acid.

6. The copolymer according to claim 1, wherein the weight-average molecular weight thereof is 2,000 to 20,000 g/mol.

7. The copolymer according to claim 6, wherein 5 to 30% by weight of isoprenol (a), 50 to 80% by weight of the monoethylenically unsaturated $C_3$ to $C_8$ carboxylic acid (b), and 10 to 30% by weight of the sulfonic acid group-comprising monomer (c) are present.

8. A method for producing copolymers comprising:
(a) 5 to 40% by weight of isoprenol,
(b) 5 to 93% by weight of at least one monoethylenically unsaturated $C_3$ to $C_8$ monocarboxylic acid, or an anhydride or salt thereof, and
(c) 2 to 90% by weight of one or more sulfonic acid group-comprising monomers;
wherein the monomers (a), (b) and (c) are polymerized in the presence of a redox chemical initiator and a chain-transfer agent at a temperature ranging from 10 to 80° C.

9. The method according to claim 8, wherein the redox chemical initiator comprises a peroxide and a reducing agent.

10. The method according to claim 9, wherein the redox chemical initiator further comprises an iron salt.

11. The method according to claim 9, wherein the redox chemical initiator, as peroxide, comprises hydrogen peroxide.

12. The method according to claim 9, wherein the redox chemical initiator as reducing agent, comprises sodium hydroxymethanesulfinate or sodium-2-hydroxy-2-sulfinatoacetic acid.

13. The method according to claim 8, wherein the chain-transfer agent comprises a mercapto compound.

14. A method for inhibiting deposits in a water-bearing system comprising:
adding the copolymer according to claim 1 in an amount of from 0.1 to 100 mg/l to a water-bearing system.

15. A method for inhibiting precipitation and sedimentation of calcium salts or magnesium salts in a water-bearing system comprising:
adding the copolymer according to claim 1 in an amount of from 0.1 to 100 mg/l to a water-bearing system.

16. The method according to claim 15 for inhibiting the precipitation and sedimentation of calcium carbonate, calcium sulfate, calcium phosphate or calcium phosphonate.

17. The method according to claim 15 wherein the water-bearing system is located in a seawater desalination plant, a brackish water desalination plant, a cooling water system or a boiler feed water system.

* * * * *